Nov. 7, 1933.  G. R. PRENTICE  1,934,141
TRAILER HITCH
Filed June 18, 1932
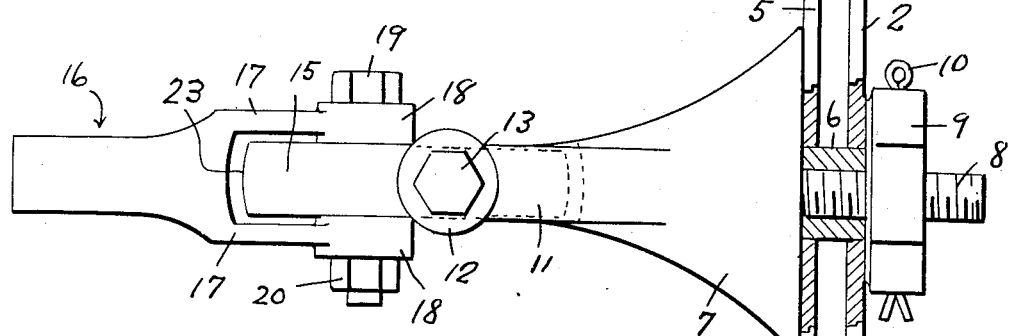
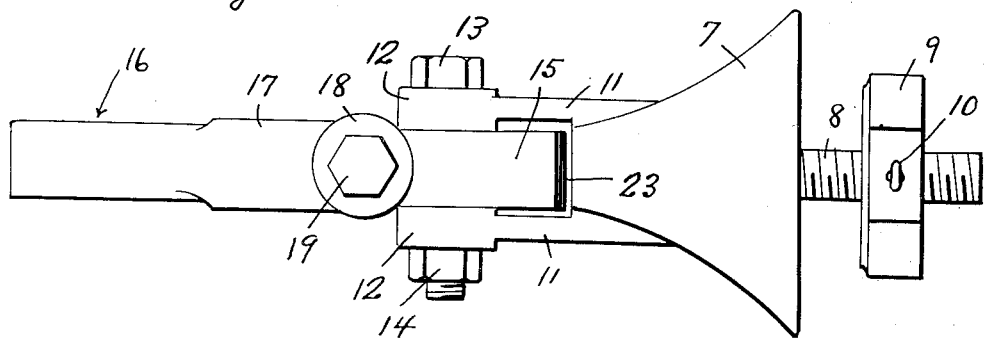
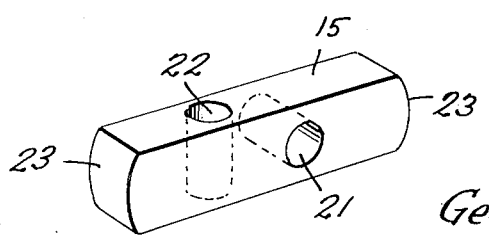
Inventor
George R. Prentice
By Clarence A. O'Brien
Attorney Patented Nov. 7, 1933

1,934,141

UNITED STATES PATENT OFFICE 1,934,141

TRAILER HITCH

George Russ Prentice, Danielson, Conn.

Application June 18, 1932. Serial No. 618,067

1 Claim. (Cl. 280—33.44)

The present invention relates to new and useful improvements in trailer hitches and has for its primary object to provide, in a manner as hereinafter set forth, a device of this character embodying a novel construction, combination and arrangement of parts through the medium of which backing and universal relative movement between the towing vehicle and trailer will be permitted, as when traveling over rough roads and when making turns, without subjecting the hitch to twisting or lateral strains.

Other objects of the invention are to provide a trailer hitch of the character described which will be simple in construction, strong, durable, highly efficient and reliable in use, compact, and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:—

Figure 1 is a view principally in top plan and partially in horizontal section, showing a trailer hitch constructed in accordance with the present invention.

Figure 2 is a view in side elevation with the novel draw bar removed.

Figure 3 is a detail view in perspective of the connecting link.

Referring now to the drawing in detail, it will be seen that the reference numeral 1 designates generally a draw bar for attachment to the towing vehicle, said draw bar including a straight metallic bar 2 having openings 3 in its end portions for the passage of securing bolts. Rigidly secured, as at 4, to the rear side of the bar 2 is a rearwardly offset bar 5, the end portions of which are engaged with said bar 2. The draw bar 1 further includes a bushing 6 extending between the bars 2 and 5.

The reference numeral 7 designates a substantially conical body of metal, the large end of which is for abutting engagement with the bar 5 of the draw bar 1. Projecting from the large end of the body 7 is a threaded shank 8 which extends rotatably through the bushing 6 and has threaded thereon a retaining nut 9. The nut 9 is threaded on the shank 8 to a position to prevent end play or longitudinal movement of said shank but to permit rotation thereof. A cotter pin 10 etxends through the nut 9 and the shank 8 for securing said nut in adjusted position.

Projecting from the small end portion of the body 7 is a pair of spaced, parallel arms 11 which terminate at their free ends in eyes 12 which are aligned with each other. A pivot bolt 13 passes through the eyes 12 and has threaded thereon a retaining nut 14. A link 15 is journaled on the pivot bolt 13 for swinging movement between the arms 11.

The reference numeral 16 designates generally a yoke which is connected with the trailer. The arms 17 of the yoke 16 extend over one end portion of the link 15 at right angles to the arms 11 and terminate, at their free ends, in aligned eyes 18 through which a pivot bolt 19 passes. The bolt 19 extends through the link 15 and has threaded thereon a retaining nut 20. As illustrated to advantage in Figure 3 of the drawing, the link 15 is provided with relatively right angularly extending openings 21 and 22 for the reception of the pivot bolts 13 and 19, respectively. The ends of the link 15 are rounded or curved, as at 23.

It will thus be seen that a hitch has been provided which will permit universal swinging movement of the trailer relative to the towing vehicle, thus preventing the appearance of lateral strains or stresses. Further, the rotary connection between the body 7 and the draw bar 1 will prevent twisting stresses. Still further, a hitch has been provided which will facilitate backing of the towing vehicle with the trailer attached thereto. The engagement of the large end of the substantially conical body 7 with the bar 5 of the draw bar 1 further supports the hitch against lateral strains, as is believed to be apparent.

It is believed that the many advantages of a trailer hitch constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:—

A trailer hitch comprising a draw bar including a straight bar for attachment to a towing vehicle, a rearwardly offset bar secured, at its ends, to the first named bar, a bushing extending between the bars, a substantially conical body having its large end engaged with a second named bar, a threaded shank projecting from the large end of the body and extending rotatably through the bushing, a retaining nut threaded on the shank and engaged with the first named bar, and means for connecting said body to a trailer for substantially universal relative swinging movement therebetween.

GEORGE RUSS PRENTICE.